Jan. 1, 1963

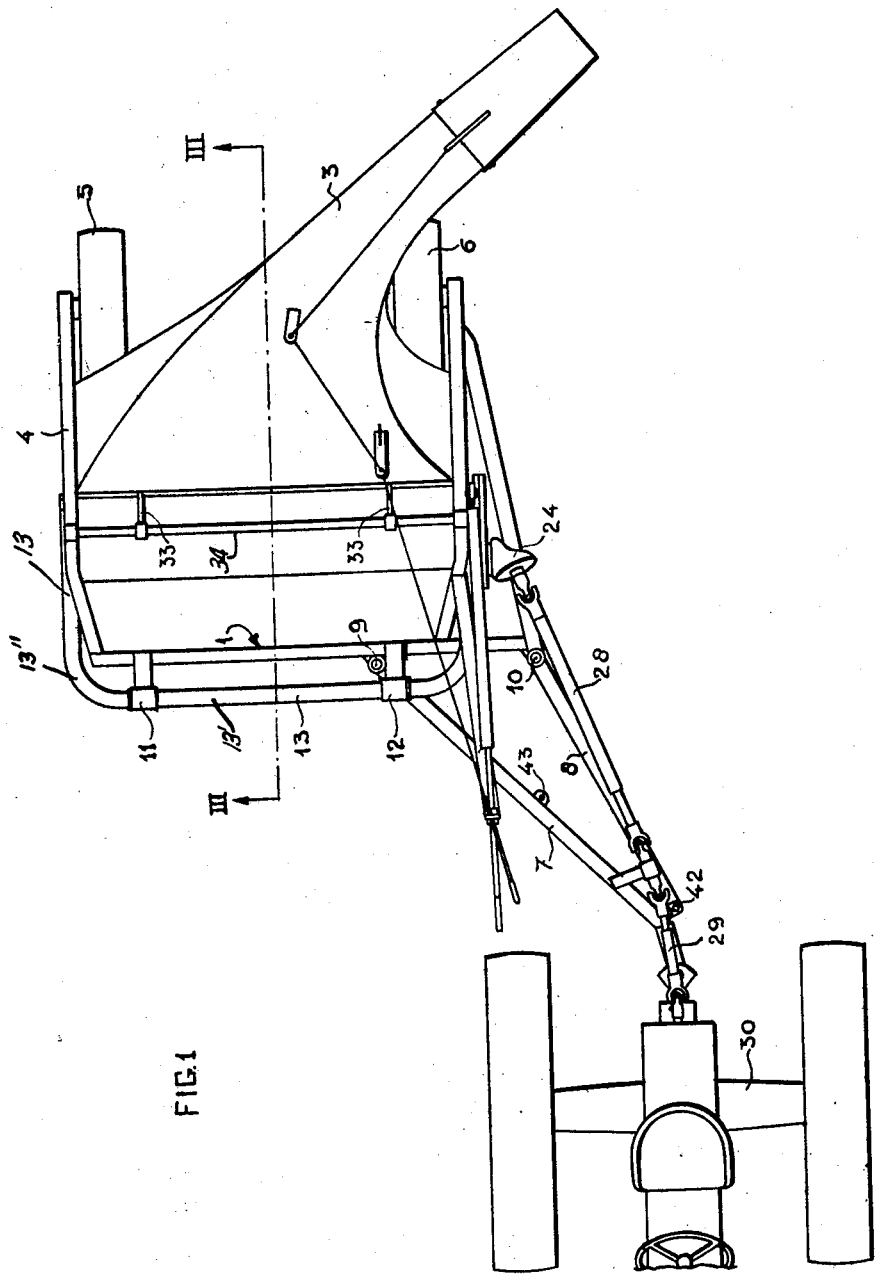

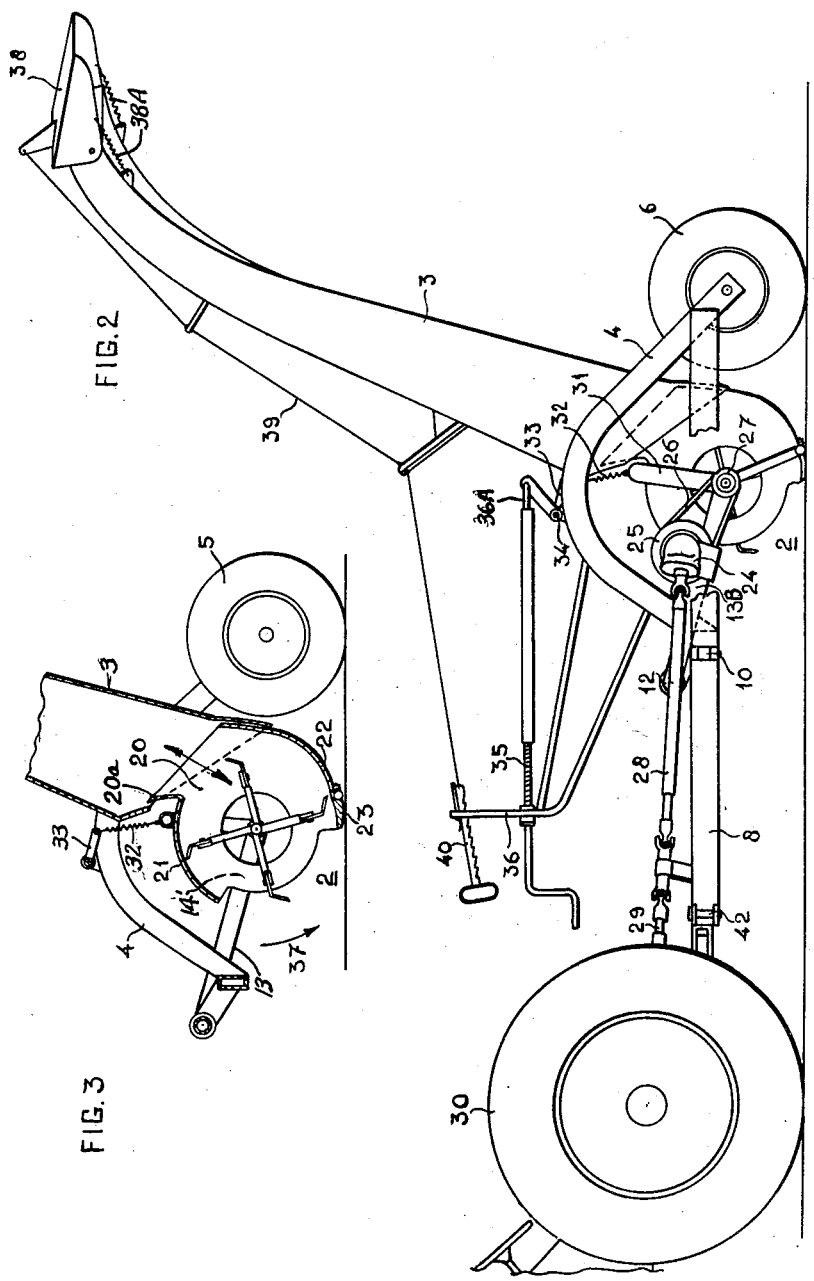

C. VAN DER LELY 3,070,940

FORAGE HARVESTERS

Filed June 18, 1959

6 Sheets-Sheet 5

INVENTOR.
Cornelis van der Lely
BY
Mason, Mason & Albright
Attys.

Jan. 1, 1963 C. VAN DER LELY 3,070,940
FORAGE HARVESTERS
Filed June 18, 1959 6 Sheets-Sheet 6

United States Patent Office 3,070,940
Patented Jan. 1, 1963

3,070,940
FORAGE HARVESTERS
Cornelis van der Lely, Maasland, South Holland, Netherlands, assignor to Patent Concern N.V., Willemstad, Netherlands Antilles, a limited-liability company of the Netherlands Antilles
Filed June 18, 1959, Ser. No. 821,154
Claims priority, application Netherlands July 17, 1958
17 Claims. (Cl. 56—24)

This invention relates to forage harvesters. Known forage harvesters comprise a frame carrying cutting mechanism for cutting off the crop near to the ground, and elevating means for delivering the cut crop. In the known implements the cutting mechanism is normally fixed as regards its location in relation to the frame of the implement.

It is an object of the invention to devise improved forage harvesters.

In accordance with a first aspect of the invention there is provided a forage harvester comprising a frame carrying a crop cutting mechanism and elevating means for delivering the cut crop, wherein the cutting mechanism is arranged so as to cut the crop near to the ground and so that such mechanism, during working travel of the harvester, may move up and down relatively to the frame in response to ground irregularities encountered during said working travel.

In accordance with a second aspect of the invention there is provided a forage harvester comprising a frame carrying a crop cutting mechanism and elevating means for delivering the cut crop, wherein the elevating means includes an upstanding delivery pipe which is of rectangular cross-section, or nearly so, at its lower end, and which as seen from above, extends laterally and rearwardly having regard to the intended line of travel of the implement.

In accordance with a third aspect of the invention there is provided a cutting mechanism for a forage harvester, comprising a cutter cylinder adapted for rotation about a substantially horizontal axis, said cylinder having knives which are spaced from one another but which appear to overlap when viewed in a direction perpendicular to the axis of rotation of the cutter cylinder, and a cutter bar with which said knives are adapted to co-operate and which is adapted to bear upon the ground when the cutting mechanism is in use.

Figure 4:
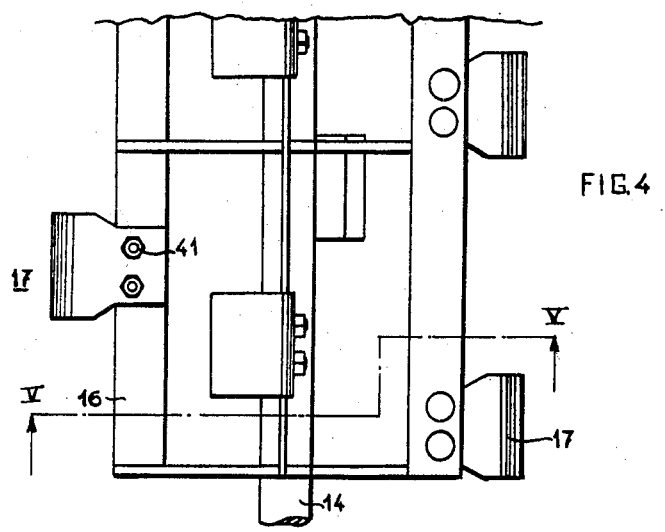
Figure 5:
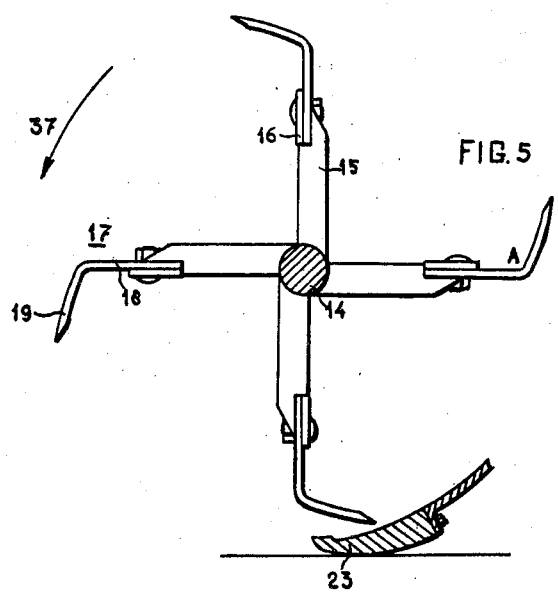
Figure 6:
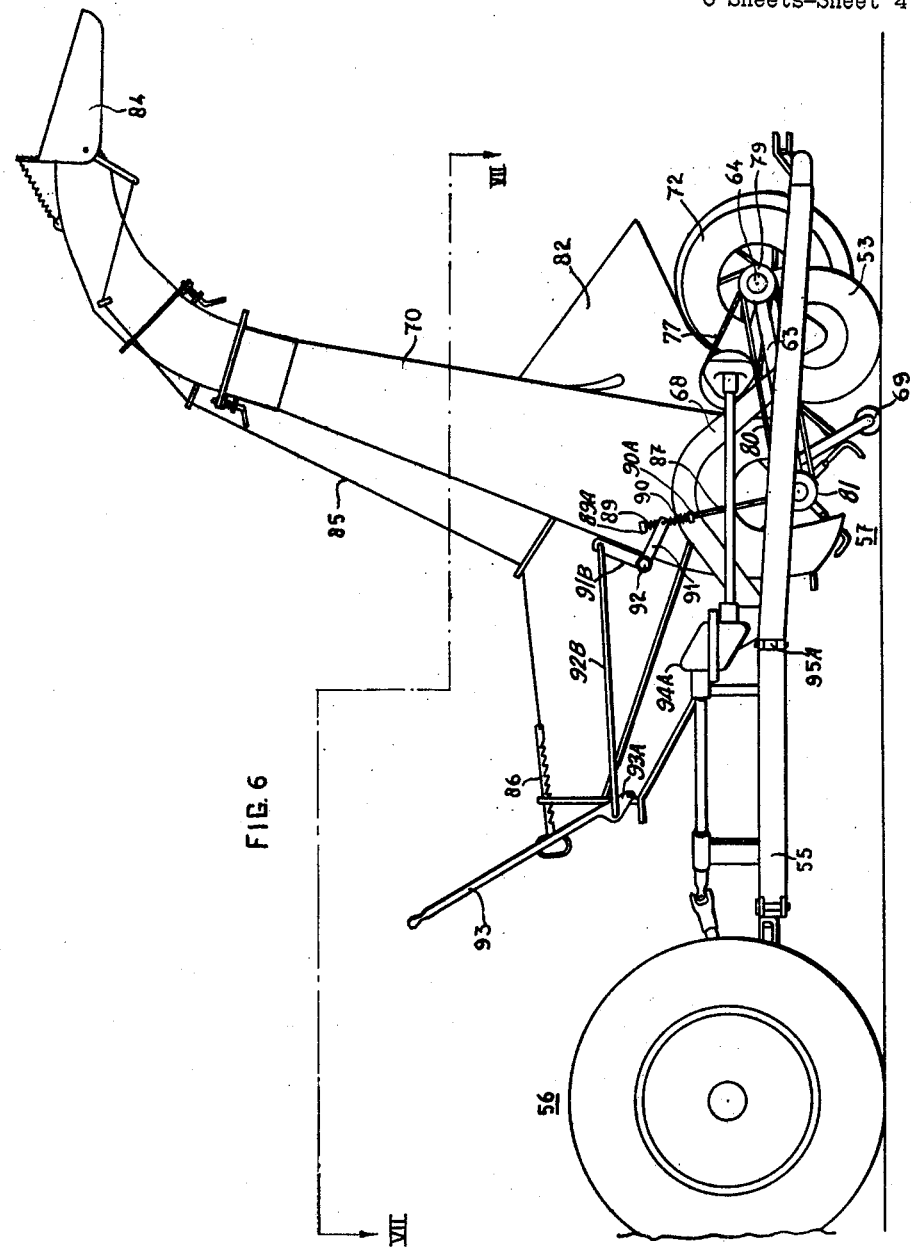
Figure 7:
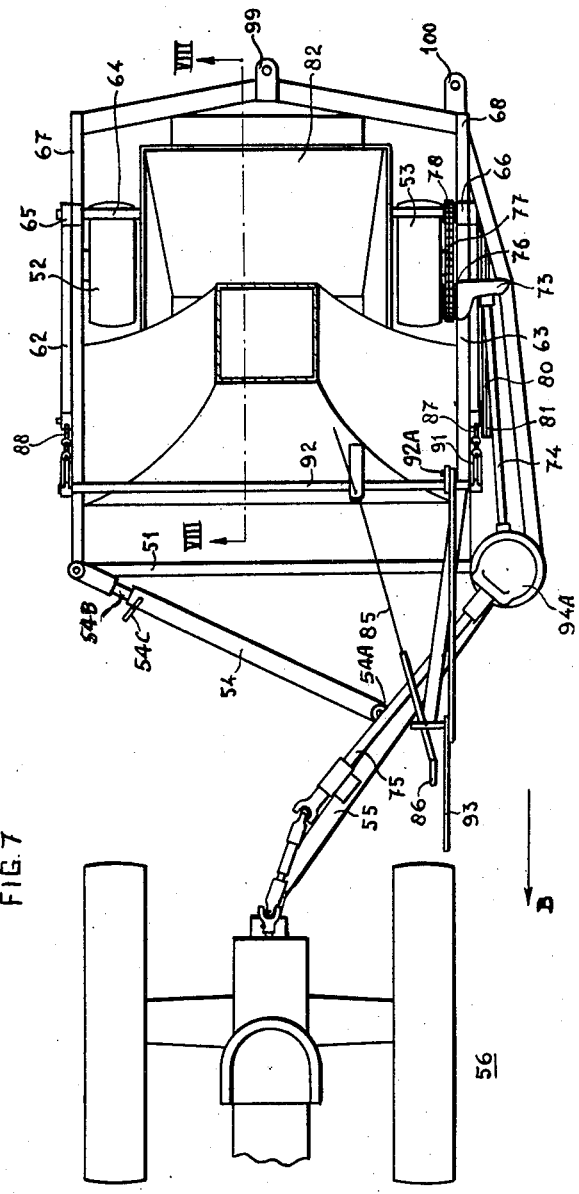
Figure 8:
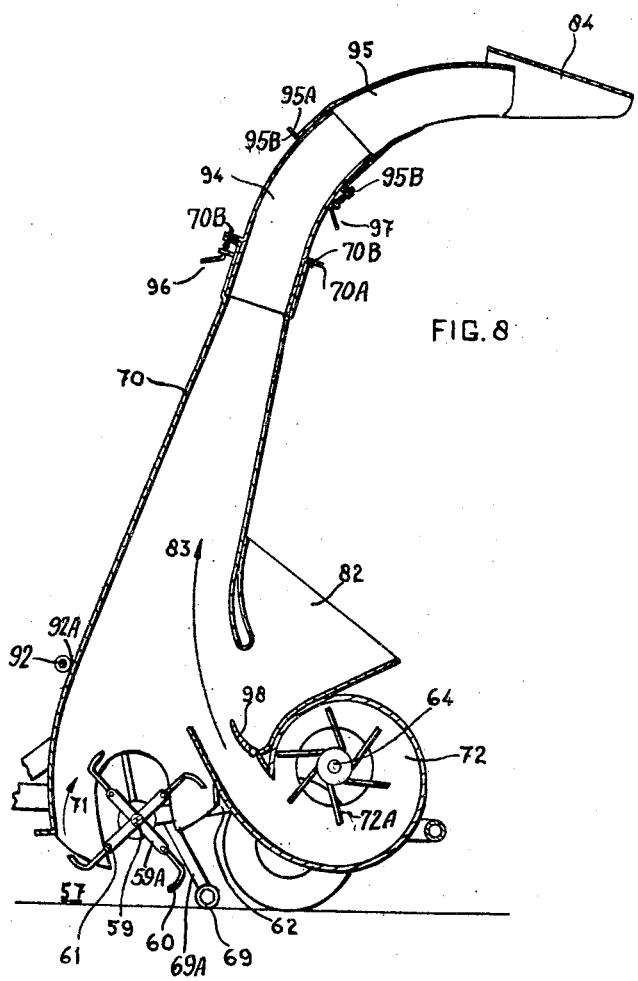

For a better understanding of the invention and to show how the same may be carried into effect, reference will now be made, by way of example, to the accompanying drawings in which:

FIGURE 1 is a plan view of a first embodiment of a forage harvester according to the invention, FIGURE 2 is a side elevation corresponding to FIGURE 1, FIGURE 3 is a sectional view taken on the line III—III of FIGURE 1, FIGURE 4 is an enlarged plan fragmentary view of a detail of the implement shown in FIGURE 1, FIGURE 5 is a sectional side elevation taken on the line V—V of FIGURE 4, FIGURE 6 is a side elevation of a second embodiment of a forage harvester according to the invention, FIGURE 7 is a sectional plan view taken on the line VII—VII of FIGURE 6, and FIGURE 8 is a sectional view taken on the line VIII—VIII of FIGURE 7.

As shown in FIGURES 1 to 5 the first embodiment comprises a frame 1 carrying a cutting mechanism 2 (see FIGURE 2) disposed at the lower end of an upstanding delivery pipe 3 for elevating the cut crop. The frame 1 includes a generally U-shaped frame beam 4, which has two ground wheels 5 and 6 mounted at the rear. The frame beam 4 has draw-bars 7 and 8 pivotally connected at 9 and 10 to the front thereof. The forward ends of the draw-bars 7 and 8 are coupled by a pin 42. The draw-bar 7 has a bracket 43 secured thereto about mid-way along its length. The end of the bar 8 may be alternatively coupled to the bracket 43, the draught point then being displaced laterally with respect to the implement. The frame 4 carries bearings 11 and 12, in which the bight 13' of a generally U-shaped member 13'' is journalled. The cutting mechanism 2 is journalled in the terminal ends of said beams 13, and said cutting mechanism is enclosed within a supporting structure 20 which is rigidly secured to an intermediate position to 14' of the beams 13. The cutting mechanism 2, includes a cutter cylinder consisting of a shaft 14 (see FIGURES 4 and 5) carrying radially extending arms 15, the extremities of which are connected by bars 16 extending parallel to the shaft 14. The bars 16 have knives 17 attached thereto, each knife having a radial portion 18 and a substantially tangential portion 19, the angle A (see FIGURE 5) between the radial end the tangential portions being between 90° and 120° (in FIGURE 5 the angle is about 95°). The knives are rigidly secured to the bars 16 by means of bolts 41, but since the bolts can be released, the knives can be readily replaced when desired. The cutter cylinder is arranged in a housing 20 (see FIGURE 3) which includes a plate 21 for screening the top of the cylinder and a plate 22 for screening the rear thereof, there being a delivery mouth 20A between these plates. The lower edge of the plate 22 carries a cutter bar 23 which bears on the ground. The cutter cylinder is driven from a gear-box 24 by means of a pulley 25, a V-belt 26 and a pulley 27 fixed on the shaft 14. The gear-box 24 is driven from a shaft 28, which extends to the front end of the draw-bar 7, where it is adapted to be coupled to the power take-off shaft 29 of a tractor 30.

Since the beam 13 can move about a pivotal axis by virtue of the provision of the bearings 11 and 12, such axis being in front of the cutting mechanism 2, the latter is capable of moving up and down in response to unevennesses in the ground. In order that the cutter bar 23 should not bear upon the ground under the action of the full weight of the cutting mechanism and its supports, a U-shaped beam 31 is arranged to overlie the plate 21, with the limbs of such beam extending downwardly to locations where they effectively support the ends of the shaft of the cutter cylinder (see FIGURES 2 and 3). The beam 31 thus takes the form of a stirrup and has drawsprings 32 which are connected to arms 33 fixed on a shaft 34 which is turnably mounted on the frame beam 4. By appropriately positioning the arms 33, the springs 32 can take at least part of the weight of the cutting mechanism 2 and housing 20. In order to increase or decrease the pressure of the cutter bar 23 on the ground, the tension in the springs 32 can be increased or decreased by turning the shaft 34 and hence the arms 33, with the aid of a screw-jack mechanism 35, supported at one end in a bracket 36 fixed to the frame beam 4, and connected at the other end to an arm 36A also fixed to the shaft 34 (see FIGURE 2). When the arms 33 are turned through a large angle in an appropriate direction, the harvester can be easily transported since the cutting mechanism can be raised well clear from the ground.

When the harvester is in use, the cutter cylinder of the cutting mechanism 2 rotates rapidly in the direction indicated by the arrow 37 in FIGURES 3 and 5, the crop being cut by the knives 19. The cutter bar 23, past which the knives 19 move, constitutes a relatively stationary knife, and the crop can be mown near to the ground. The cutter bar preferably has a sharp edge which is located slightly above the ground. Owing to the rapid rotation of the cutting cylinder the crop is thrown up into the delivery pipe 3, this action being assisted by the rush of air up the delivery pipe resulting from the rotation of the bars 16 and knives 17. The knives 17 are arranged in the cutter cylinder in such a way, that they partly overlap each other, as seen in a direction perpendicular to the axis of rotation, as is evident from FIGURE 4. The knives 17 are distributed substantially helically along the curved surface of the cutter cylinder, which ensures a satisfactory mowing action.

At its top end the delivery pipe 3 has a flap 38, which can be adjusted by means of a pull-wire 39 and a spring-loaded rack bar 40 entered in a slot formed in the bracket 36. The flap 38 is urged, by springs 38A, downwardly and can be raised by pulling the rack bar 40 forwardly. In this way the direction in which the crop is delivered can be varied.

The delivery pipe 3 is of a rectangular cross-section which decreases in area from bottom to top. The plane of the rectangle at the lower end of the pipe 3 is substantially horizontal, and that at the top is substantially vertical, the latter plane being turned away from the line of travel of the implement through an angle of about 45°. The flow lines afforded by the delivery pipe 3 thus formed allow uninterrupted transport of crop. The lower end of the delivery pipe 3 which is secured to the frame 4, is so shaped that the delivery mouth 20A of the housing 20 is capable of moving in the lower part of the pipe 3.

As is shown in FIGURES 6, 7 and 8 a second embodiment of the forage harvester comprises a frame built up from frame beams 51, 67 and 68, provided with two ground wheels 52 and 53. Beams 67 and 68 are arranged parallel along each side of the harvester and are joined at their forward extremities by transverse beam 51. At the front of the frame beam 51 there are pivotally attached two draw-bars 54 and 55, the bar 55 being connected with a tractor 56. The bar 54 is pivotally connected to the bar 55 at 54A, and is made extensible by any known mechanical means to achieve such result such as part 54B being telescopically received within rod 54, with pin 54C providing selective securing means, so that the effective line of draught may be altered by adjusting the length of the bar 54.

The frame carries a cutting mechanism 57, which consists of a cutter cylinder having a shaft 59, with extending pieces 59A, to which knives 60 are pivotally connected to pivots 61, so that the knives are free to move about these pivots. The shaft 59 is rotatably mounted on two parallel frame beams 62 and 63, which are both pivotally journalled on a shaft 64 disposed behind the shaft 59. Shaft 64, in turn, is journalled in bearings 65 and 66 (see FIGURE 7) secured on the frame beams 67 and 68. Since the beams 62 and 63 can be swung about the axis of the shaft 64, the cutting mechanism 57 is correspondingly movable up and down relative to the frame. Each of the beams 62 and 63 has a downwardly extending arm 69A carrying a supporting roller 69, these rollers engaging the ground and ensuring that the knives 60 of the cutting mechanism 57 are spaced a short distance from the ground when the cutter cylinder is in operation.

The cutting mechanism 57 is disposed at the lower end of a delivery pipe 70, which is rigidly secured to the frame of the implement. When the implement is moved in the direction shown by the arrow B in FIGURE 7, the cutter cylinder is rotated in the direction shown by the arrow 71 in FIGURE 8, the crop being thrown by the cutter cylinder into the delivery pipe 70. The cutter cylinder acts also as an impeller, so that a flow of air is produced thereby up the pipe 70. To increase the rising air-flow there is a rotary blower 72 the rotor 72A of which is disposed on the shaft 64. The drive to the blower 72 and the cutting mechanism 57 is obtained through a gear-box 73, which is driven from the power take-off shaft of the tractor 56 through transmission shafts 74 and 75. The shaft 64 is driven from the gear-box 73 with the aid of sprocket wheels 76 and 78, and a chain 77. The cutting mechanism 57 is driven from the shaft 64 with the aid of pulleys 79 and 81, and a belt 80.

Because of the provision of the blower 72, the implement can be used for transferring corp from wagons or the like to storage places. In this case the drive to the cutting mechanism 57 is interrupted, so that only the blower 72 remains operative. An inlet mouth 82 is provided at the rear side of the delivery pipe 70, into which mouth the crop can be thrown. The crop is then elevated by the flow of air produced by the blower 72 in the direction of the arrow 83 (see FIGURE 8) through the delivery pipe 70. The mouth 82 is provided, near the outlet from the blower 72, with a baffle 98 in the form of a flap which can deflect downwardly against the action of a spring (not shown). The baffle ensures that the air from the blower is directed up the pipe 70 and does not escape through the mouth 82.

The upper end of the delivery pipe 70, as in the preceding embodiment, is provided with a flap 84, which can be actuated by a pull wire 85 and a rack bar 86. The top part of the delivery pipe 70 is divided into portions 94 and 95 (see FIGURE 8), which can be turned relative to each other and to the lower part of the pipe 70. The portion 94 fits within the end of the lower part of the pipe 70 and has a flange 70A formed with a series of holes 70B into which a spring-urged pin 96 can be selectively inserted, the pin 96 being carried upon the part 70 and thus serving as a releasable locking device. The portion 95 fits over the upper end of the portion 94 and also has a flange 95A formed with a series of holes 95B into which a spring-urged pin 97 can be inserted. The pin 97 is mounted on the portion 94 and serves also as a locking device. Thus a wide variation in the discharge direction for the crop can be obtained, which is of great importance in elevating the crop to storage places.

The cutting mechanism 57, like that of the preceding embodiment, can be adjusted in relation to the ground. For this purpose the free end of each of the beams 62 and 63 has a rod 87, 88 attached thereto. Each rod carries a pair of compression springs 89 and 90 seated against collars 89A and 90A fixed on the rod. A loose collar on each rod has one end of a fork 91 pivotally attached thereto (see FIGURE 6), the loose collar lying between the end of the pair of springs. Each fork 91 is fast on a shaft 92 arranged to be turnably supported by projections 92A from pipe 70. An arm 91A is fixed on the shaft 92 and is connected by a rod 92B to a lever 93 which is pivotally supported on the implement frame at pivot 93A.

As previously noted, the draw-bar 54 is extensible whereby the line of draught may be altered in relation to the implement. In order to ensure a satisfactory drive to the gear-box 73 with a changed line of draught, an intermediate gear-box 94A is provided between the shaft 74 and the shaft 75, such gear-box being formed in two relatively, angularly, displaceable portions, the axis of angular displacement being in line with the vertical pivot axis 95A of the draw-bar 55.

The forage harvester shown in FIGURE 7 is provided at the rear with a coupler 99 for connecting a wagon thereto. The coupler 99 is located centrally and a further coupler 100 is located to one side of the harvester. The coupler 100 may be employed when it is required that the wagon should run to some extent at the side of the harvester, so that the cutting mechanism can operate close to the side of a field.

The cutting mechanism 57 may also be employed for lifting mown grass from the ground and for transporting it up the delivery pipe 70. For performing this operation the implement may be used in its position behind the tractor shown in FIGURE 7. When the harvester is stationary and is used as an elevator by feeding crop into the mouth 82, the blower 72 need not necessarily be employed since the cutting mechanism 57 can be raised well clear of the ground and used as an impeller for providing the necessary flow of air up the pipe for elevation of the crop.

What I claim is:

1. A forage harvester comprising a mobile frame, an upwardly and rearwardly directed discharge chute, a cutter blower, journalled in a supporting structure in registry with the lower end of said discharge chute, said supporting structure being pivotally connected to said frame about a substantially horizontal axis extending transverse to the direction of travel of the harvester, said axis being laterally spaced with respect to said structure.

2. A forage harvester comprising a mobile frame, an upwardly and rearwardly directed discharge chute, a cutter blower having a delivery chute in registry with the lower end of said discharge chute, said cutter blower being pivotally connected to said frame by means of a laterally and vertically directed link, and a suspension spring interconnecting said link and said frame.

3. The structure of claim 1, wherein said cutter blower comprises a cutter and a separately mounted blower, each having its own casing.

4. The structure of claim 2, wherein said cutter blower comprises a cutter and a separately mounted blower, each having its own casing.

5. The structure of claim 1, wherein said cutter blower is provided with casing means having shoe means adapted for engagement with the ground as the cutter moves thereover.

6. The structure of claim 2, wherein said cutter blower is provided with casing means having shoe means adapted for engagement with the ground as the cutter moves thereover.

7. The structure of claim 1, wherein said cutter blower is provided with a casing, said casing and discharge chute being at least in partial telescoping relation to each other.

8. The structure of claim 2, wherein said cutter blower is provided with a casing, said casing and discharge chute being at least in partial telescoping relation to each other.

9. The structure of claim 2, wherein said cutter blower is at least partially supported by a ground-engaging supporting roller.

10. The structure of claim 1, wherein said delivery chute comprises a plurality of detachable sections.

11. The structure of claim 2, wherein said delivery chute comprises a plurality of detachable sections.

12. The structure of claim 1, wherein said delivery chute comprises a plurality of sections and means for connecting said sections whereby they may be rotated relative to each other, at least one of said sections being of curved configuration.

13. The structure of claim 2, wherein said delivery chute comprises a plurality of sections and means for connecting said sections whereby they may be rotated relative to each other, at least one of said sections being of curved configuration.

14. The structure of claim 1, wherein power means is provided for driving said cutter blower.

15. The structure of claim 2, wherein power means is provided for driving said cutter blower.

16. The structure of claim 1, wherein said frame includes a pair of draw bars arranged to turn about their pivots whereby to permit adjustment of the position of the line of draught of said cutter blower.

17. The structure of claim 2, wherein said frame includes a pair of draw bars arranged to turn about their pivots whereby to permit adjustment of the position of the line of draught of said cutter blower.

References Cited in the file of this patent

UNITED STATES PATENTS

| | | |
|---|---|---|
| 2,496,493 | Raney | Feb. 7, 1950 |
| 2,674,081 | Hansen | Apr. 6, 1954 |
| 2,683,345 | Meyer | July 13, 1954 |
| 2,705,861 | Mott | Apr. 12, 1955 |
| 2,786,317 | Lundell | Mar. 26, 1957 |
| 2,811,004 | Borrow | Oct. 29, 1957 |
| 2,817,945 | McClellan | Dec. 31, 1957 |
| 2,836,022 | Caldwell | May 27, 1958 |
| 2,864,223 | Lundell | Dec. 16, 1958 |

FOREIGN PATENTS

| | | |
|---|---|---|
| 1,199,177 | France | June 15, 1959 |